United States Patent [19]

Frank et al.

[11] Patent Number: 4,699,660

[45] Date of Patent: Oct. 13, 1987

[54] USE OF HUMATES IN PRINTING INKS

[75] Inventors: Walter C. Frank, Holland, Pa.; James C. West, Lawrenceville, N.J.

[73] Assignee: Union Camp Corporation, Wayne, N.J.

[21] Appl. No.: 829,271

[22] Filed: Feb. 13, 1986

[51] Int. Cl.$^4$ ............................................. C09D 11/12
[52] U.S. Cl. ...................................... 106/31; 106/20; 106/24; 106/30
[58] Field of Search ....................... 106/27, 20, 24, 30, 106/31, 277

[56] References Cited

U.S. PATENT DOCUMENTS 4,034,794  7/1977  Gebler et al. ................... 106/38.28
4,556,427 12/1985  Lewis ................................. 106/20

OTHER PUBLICATIONS

Derwent Abstract Accession No. 84-306256, Russian Patent No. SU1089130, Apr. 30, 1984.

Primary Examiner—Amelia Burgess Yarbrough
Attorney, Agent, or Firm—Kane, Dalsimer, Sullivan, Kurucz, Levy, Eisele and Richard

[57] ABSTRACT

Stabilized, aqueous dispersions of humate-surfactant are disclosed as inks.

6 Claims, No Drawings

USE OF HUMATES IN PRINTING INKS

BACKGROUND OF THE INVENTION

1. Field of the Invention

The invention relates to humate and its use in printing ink and coating compositions. More particularly, the invention relates to the use of humate-surfactant compositions as components of printing and colorant coating compositions.

2. Brief Description of the Prior Art

A wide variety of organic and inorganic materials have been used as components of printing and coating compositions, including humates; see for example U.S. Pat. No. 4,556,427.

SUMMARY OF THE INVENTION

The invention comprises an ink composition, which comprises; an aqueous dispersion of humate, stabilized by adjustment of the pH to a neutral or slightly alkaline state (circa 7.0–10.0; preferably 7.0–9.0); and a surfactant.

The compositions of the invention may be used themselves as a marking ink or they may be used as the coloring source in conventional ink formulations or like vehicle, obviating the need for binders in some instances. The ink compositions are, in one embodiment, aqueous dispersions and thereby obviate the need for organic solvents and/or hydrocarbon oils as carrier vehicles.

As colorants, the compositions of the invention have a high affinity for cellulosic substrates. After drying on such substrates, the dried colorant resists removal by rubbing or by application of water or organic solvents.

The compositions of the invention may be utilized as a component of printing, inks that are commercially utilized in offset, letterpress, flexographic, and gravure printing.

DETAILED DESCRIPTION OF THE PREFERRED EMBODIMENTS OF THE INVENTION

The term "humate" as used throughout the specification and claims refers to the product of decayed plant and animal material (humus). The preferred humate employed in the method and compositions of the invention are generally derivatives of the natural flocculation or precipitation in sand deposits, of humic substances that were derived from natural humus found in association with earth sources. A most preferred source of humate is one derived from humic substances found in association with titanium mineral deposits. Titanium mineral deposits include for example, ilmenite and rutile sand deposits. Titanium mineral sand deposits are found in several places throughout the world. In the United States, titanium sand deposits are located in Florida, Georgia and South Carolina. Titanium rock deposits may be found in the Adirondack mountains of New York State.

Other naturally occurring humate and humic sources include "leonardite", an oxidized form of lignite found chiefly in South Dakota and in the Menefee formation in northwestern New Mexico.

The humate employed according to the invention may also be treated so as to optimize the number of desired cations on the humate molecule, i.e., the monovalent metallic, multivalent metallic or ammonium cation. Treatment with sodium hydroxide, potassium hydroxide, ammonium hydroxide, calcium hydroxide, zinc oxide or the like will affect the desired optimization.

The compositions of the invention are prepared by first providing the above described humate, separated from its previous association with earth sources. The humate is used by simple admixture with water and a surfactant.

When humate is dispersed in water with a surfactant by a variety of means, including chemical and/or mechanical action, a stable dispersion is created. This dispersion is in essence a colored coating or ink which can be used for transferring images to various substrates. When the colored coating or ink is dried, as observed by the evaporation and/or absorption of water into the substrate, a water insensitive image remains on the substrate. This image is highly resistant to abrasion and dissolution by organic solvents. The humate composition of the invention may be considered as a coating, staining or dyeing substance for numerous substrates. The compositions of the invention may be used as a coloring and coating substance, with and without chemical and physical modification, for many imprintable substrates including leather, textile materials, cellulosics such as paper, polymeric resin films such as films of polyolefins, metals and like materials. They are particularly useful to print a cancellation image upon postage stamps, resisting removal by solvents, rubbing, erasure or like means of removal.

The compositions of the invention, although they are inks in themselves, may be useful as ingredients of conventional and known printing ink formulations, enhancing the tenacity of the ink to adhere to substrates such as paper.

Conventional printing inks are well known compositions and are generally composed of pigments such as carbon black, bound in an organic solvent by a resinous material referred to as a binder. The compositions of the present invention (particularly the humate ingredient) function as binders and may be used to replace some or all of the conventional resin binder in the conventional printing ink.

The proportion of humate which may be employed in the compositions of the invention is generally not critical. In general, when employed principally as a pigment or a colorant, the humate may comprise from 1 to 50 percent by weight of the total ink composition. When employed principally as a binder, the humate may comprise from 1 to 50 percent by weight of the total composition. The humate may be employed in any useful proportion, when used as a filler. Generally a useful proportion is within the range of from 1 to 30 percent by weight of the total ink composition.

The term "surfactant" as used herein is a contraction of "surface-active agent" and is a broadly descriptive term used to describe a chemical compound which is (1) soluble in at least one phase of a system, (2) has an amphipathic structure, (3) the molecules of which form oriented monolayers at phase interfaces, (4) exhibits an equilibrium concentration as a solute at a phase interface, greater than its concentration in the bulk of the solution, (5) forms micelles when the concentration as a solute in solution, exceeds a characteristic limiting value and (6) exhibits some combination of the functional properties of detergency, foaming, wetting, emulsifying, solubilizing and dispersing. The surfactants employed in the present invention advantageously possess a "wetting" property, i.e.; they reduce the surface tension of the compositions of the invention. Surfactants are well known as are the method of their preparation. Surfactants may be classified as anionic, non-ionic, cationic and amphoteric. Representative of anionic surfactants are carboxylic acids and salts, sulfonic acids and salts, sulfuric acid esters and salts and phosphate esters and salts. Representative of nonionic surfactants are ethoxylated alkylphenols, ethoxylated aliphatic alcohols, carboxylic esters, carboxylic amides, and polyoxyalkylene oxide block copolymers. Representative of cationic surfactants are amines not containing oxygen, oxygen-containing amines, except amides, amines having amide linkages, and quarternary salts. Preferred as ingredients of the compositions of the present invention are the nonionic surfactants and most preferably the anionic surfactants.

The proportion of surfactant employed to prepare the compositions of the invention is a surface active proportion (generally within the range of from about 0.001 to 10.0 percent by weight of the composition).

The presence of the surfactant as an ingredient in the compositions of the invention is critical to the invention. In the absence of the surfactant component, the composition upon drying will lack the degree of resistance to removal by organic solvents.

The following examples describe the manner and process of making and using the invention and set forth the best mode contemplated by the inventor of carrying out the invention but are not to be construed as limiting.

PREPARATION 1

A quantity of titanium sand deposit was provided, from the Florida Geologic formation. The titanium sands are in a formation commonly referred to as "hardpan". The hardpan comprises titanium sands bound together by a coating of humate. It is humate from these titanium bearing sands which is employed in the present examples.

The desired humate is separated from the titanium sand deposits by first breaking up the deposit formation of hardpan into a ground ore of a convenient size for handling. Much of the humate in the ground ore can be washed off with water to effect the desired separation. Additional humate is obtained by washing the concentrated ore with aqueous sodium hydroxide. The separated humate may then be dried in the sunlight or by artificial means. The average composition of the titanium sand derived humate is as follows:

| COMPOSITION OF TITANIUM SAND HUMATE ||||||||
|---|---|---|---|---|---|---|---|
| Elemental Composition (Dry Basis) (%) ||||| Composition, Wt. % |||
| ||||| "Ash Is" | Ash ||
| C | H | O | N | S | Moisture | ("As Is") | Ash(Dry Basis) |
| 36.7 | 2.3 | 23.7 | 0.6 | 0.3 | 9.8 | 30.9 | 34.3 |

| Functional Group Contents (Dry Basis) meq/g* || Ratios, Wt./Wt. (Dry Basis) ||
|---|---|---|---|
| Total Acidity | Carboxylic Acid | C:H | C:O |
| 6.0 | 2.1 | 16.0:1 | 1.5:1 |

| Metal Contents (Dry Basis) (%) ||||
|---|---|---|---|
| AL | Ti | Fe | Ca |
| 6 | 1 | 1 | 0.1 |

*Methods for the functional group analysis may be found in M. Schitzer and S.U. Khan, "Humic Substances in the Environment," Marcel Dekker, Inc., New York, New York 1972, pp. 39-41. The barium hydroxide method for total acidity and calcium acetate method for carboxylic acid groups described in the citation were used.

PREPARATION 2

A quantity of titanium sand deposits was provided, from its Florida geological formation at Trail Ridge, Florida.

The humate was separated from the ilmenite deposits in a manner similar to that used in Preparation 1, supra. The following Table shows the elemental composition and metal content on the humate composition separated from the Trail Ridge deposit.

TABLE

| Element | Composition (%) |
|---|---|
| C | 45.21 |
| H | 3.25 |
| O | 23.75 |
| S | 0.30 |
| ash | 23.99 |
| Ti | 0.61 |
| Zr | 0.014 |
| Al | 5.34 |
| Fe | 0.46 |
| Ca | 0.007 |
| C/O ratio | 1.9:1.0 |
| C/H ratio | 13.9:1.0 |

It will be appreciated that the above analysis for humates associated with titanium ore deposits is for specific materials and the compositional make-up may vary somewhat for different materials within the same ore body. In general the preferred humate compositions employed in the method of the invention have compositional make-ups which provide a carbon to hydrogen ratio (weight to weight) of from 9.5–17.5:1.0; a carbon to oxygen ratio of 1.0–2.3:1.0; an aluminum content of 2.8 to 8.4 percent by weight, a titanium content of 0.5 to 3.5 percent by weight and calcium content of less than 0.5 percent by weight.

It will also be appreciated from the above that the humate associated with titanium mineral deposits bears some resemblance in compositional make-up to leonardite, a humate substance. A commercially available leonardite has the following composition:

| COMPOSITION OF A LEONARDITE |||||||
|---|---|---|---|---|---|---|
| Elemental Composition (Dry Basis) (%) |||| Composition, Wt. % |||
| |||| "Ash Is" | Ash ||
| C | H | O | S | Moisture | ("As Is") | Ash(Dry Basis) |
| 50.61 | 2.80 | 19.83 | 1.15 | 15.50 | 16.87 | 19.96 |

| Functional Group Contents (Dry Basis) meq/g* || Ratios, Wt./Wt. ||
|---|---|---|---|
| Total Acidity | Carboxylic Acid | C:H | C:O |
| 5.3 | 1.8 | 18.1:1 | 2.6:1 |

| Metal Contents (Dry Basis) (%) ||||
|---|---|---|---|
| AL | Ti | Fe | Ca |
| 0.8 | 0.06 | 1.1 | 2.4 |

The commercially available Leonardite may be ammoniated by the method described in U.S. Pat. No. 3,111,404 to provide a preferred humate for use in the method of the invention.

The humate materials of Preparations 1 and 2, described above and the commercially available leonardite may be used in the compositions of the invention as is or after separation of its ash content.

EXAMPLE 1

A humate-water-surfactant dispersion is prepared by adding 5 grams of humate from Preparations 1 or 2, supra., to 95 grams of water containing 2 gms of sodium dioctyl sulfosuccinate. A stable dispersion is obtained by adding ammonium hydroxide to the dispersion dropwise until a pH of approximately 7.5 to 8.0 is obtained. This dispersion is printed on paper with a flexographic hand proofer. The print is light brown in appearance and is printed (transferred from roller to paper) acceptably. When the print is dry (approximately 5 minutes at ambient conditions), the printed surface is non-washable with water or organic solvents.

EXAMPLE 2

The procedure of Example 1, supra., is repeated except that 9.0 gms of carbon block is added to the dispersion. The resulting ink, when applied to cancel stamps, resists removal by organic solvents.

What is claimed is:

1. An ink composition, which consists essentially of: an aqueous dispersion of humate, stabilized by adjustment of the pH to a neutral or slightly alkaline state; wherein the humate has a compositional make-up which provides a carbon to hydrogen ratio (weight to weight) of from 9.5–17.5:1.0; a carbon to oxygen ratio of 1.0–2.3:1.0; an aluminum content of 2.8 to 8.4 percent by weight, a titanium content of 0.5 to 3.5 percent by weight and a calcium content of less than 0.5 percent by weight; and a surfactant possessing wetting properties.

2. The composition of claim 1 wherein the dispersion is stabilized with ammonium hydroxide.

3. In an ink composition which consisting essentially of a pigment, a binder and an aqueous carrier, the improvement which comprises; the presence of a humate having a compositional make-up which provides a carbon to hydrogen ratio (weight to weight) of from 9.5–17.5:1.0; a carbon to oxygen ratio of 1.0–2.3:1.0; an aluminum content of 2.8 to 8.4 percent by weight; a titanium content of 0.5 to 3.5 percent by weight and a calcium content of less than 0.5 percent by weight; and a surfactant.

4. The improved composition of claim 3 wherein the humate is in the form of an aqueous dispersion stabilized by adjustment of the pH to a neutral or slightly alkaline state.

5. The composition of claim 3 wherein the surfactant is an anionic surfactant.

6. The composition of claim 5 wherein the surfactant is sodium dioctyl sulfosuccinate.

* * * * *